(12) United States Patent
Goriawala et al.

(10) Patent No.: US 9,643,106 B2
(45) Date of Patent: May 9, 2017

(54) SCREEN DECANTER FOR REMOVING SOLIDS FROM WASTEWATER

(71) Applicant: ClearCove Systems, Inc., Victor, NY (US)

(72) Inventors: Qausarali Goriawala, Rochester, NY (US); Michael A. Butler, Webster, NY (US); Terry Wright, Rochester, NY (US); Alfred Bertoni, Fairport, NY (US); Jonathan M. Jacobs, Staten Island, NY (US)

(73) Assignee: ClearCove Systems, Inc., Victor, NY (US)

( * ) Notice: Subject to any disclaimer, the term of this patent is extended or adjusted under 35 U.S.C. 154(b) by 0 days.

(21) Appl. No.: 15/046,481

(22) Filed: Feb. 18, 2016

(65) Prior Publication Data

US 2016/0243471 A1    Aug. 25, 2016

Related U.S. Application Data

(63) Continuation-in-part of application No. 14/984,206, filed on Dec. 30, 2015, and a continuation-in-part of
(Continued)

(51) Int. Cl.
*B01D 21/00*    (2006.01)
*B01D 21/24*    (2006.01)
*B01D 21/34*    (2006.01)

(52) U.S. Cl.
CPC ..... *B01D 21/0006* (2013.01); *B01D 21/0012* (2013.01); *B01D 21/2427* (2013.01);
(Continued)

(58) Field of Classification Search
CPC .............. B01D 21/006; B01D 21/0012; B01D 21/2427; B01D 21/2444
See application file for complete search history.

(56) References Cited

U.S. PATENT DOCUMENTS 2,401,745 A    6/1946    Brown
3,006,474 A    10/1961   Fitch
(Continued)

FOREIGN PATENT DOCUMENTS

EP    0010395 A1    4/1980
EP    0421265 A1    4/1991
(Continued)

OTHER PUBLICATIONS

"Vortex Grit Chamber KD 01.5", Dec. 17, 2013 (Dec. 17, 2013), X P055236807 Retrieved from the Internet: URL: http://www.dwe.dk/files/files/produkter/KD01-5_bro_GB.pdf [retrieved on Dec. 16, 2015] p. 2; figure 1, 2.
(Continued)

*Primary Examiner* — Chester Barry
(74) *Attorney, Agent, or Firm* — Harris Beach PLLC; Neal L. Slifkin

(57) ABSTRACT

A screen decanter for screening solids from waste water in a waste water treatment system comprising a drain manifold and a plurality of cylindrical cartridges mounted to the drain manifold, each of the cylindrical cartridges having an outer screen defining a cavity. Each of the cartridges includes a drain standpipe disposed within the cavity in communication with the drain manifold. Each drain standpipe includes a plurality of patterned openings arranged in at least one row along the length and partial circumference thereof and preferably comprises three rows of patterned openings, each row being disposed at a 120° rotational angle from the adjacent row of patterned openings. Each drain standpipe is disposed at a 30° rotational angle from its neighbor drain standpipe such that no row of patterned openings in any of said drain standpipes faces directly at any other row of patterned openings in any other drain standpipe.

13 Claims, 6 Drawing Sheets

Related U.S. Application Data application No. 14/471,247, filed on Aug. 28, 2014, now abandoned, and a continuation-in-part of application No. 14/142,197, filed on Dec. 27, 2013.

(52) U.S. Cl.
CPC .......... *B01D 21/2444* (2013.01); *B01D 21/34* (2013.01); *B01D 2201/087* (2013.01); *C02F 2303/24* (2013.01)

(56) References Cited

U.S. PATENT DOCUMENTS

| | | |
|---|---|---|
| 3,372,715 A | 3/1968 | Ashton |
| 3,717,257 A | 2/1973 | Boyle |
| 3,957,655 A | 5/1976 | Barefoot |
| 3,964,512 A | 6/1976 | Dumas |
| 3,997,198 A | 12/1976 | Linder |
| 4,009,106 A | 2/1977 | Smith |
| 4,192,746 A | 3/1980 | Arvanitakis |
| 4,202,372 A | 5/1980 | Gibbons |
| 4,226,714 A | 10/1980 | Furness et al. |
| 4,367,145 A | 1/1983 | Simpson et al. |
| 4,474,213 A | 10/1984 | Jameson |
| 4,715,570 A | 12/1987 | Mashuda |
| 5,205,768 A | 4/1993 | Pollack |
| 5,352,356 A * | 10/1994 | Murphy ............. B01D 17/0208 137/398 |
| 5,411,633 A | 5/1995 | Phillips et al. |
| 5,951,878 A | 9/1999 | Astrom |
| 6,213,515 B1 | 4/2001 | La Terra |
| 7,972,505 B2 | 7/2011 | Wright |
| 8,225,942 B2 | 7/2012 | Wright |
| 8,398,864 B2 | 3/2013 | Wright |
| 8,721,889 B2 | 5/2014 | Conner et al. |
| 8,875,371 B2 | 11/2014 | Patten et al. |
| 2003/0164341 A1 | 9/2003 | Use et al. |
| 2007/0095749 A1 | 5/2007 | Komatsu |
| 2008/0296228 A1 | 12/2008 | Sauvignet et al. |
| 2009/0065957 A1* | 3/2009 | Mao .................... B01F 3/04049 261/78.1 |
| 2009/0095672 A1 | 4/2009 | Wilcher et al. |
| 2010/0236999 A1 | 9/2010 | Utsunomiya |
| 2011/0042844 A1* | 2/2011 | Brown ............. A61F 13/15658 264/101 |
| 2011/0073296 A1* | 3/2011 | Richard ................ E21B 43/082 166/56 |
| 2011/0278212 A1* | 11/2011 | Tyner ................. B01D 21/2422 210/170.09 |

FOREIGN PATENT DOCUMENTS

| | | |
|---|---|---|
| EP | 1700963 A1 | 9/2006 |
| GB | 1079809 A | 8/1967 |
| JP | H03 65298 A | 3/1991 |
| JP | 2002001310 A | 1/2002 |
| WO | 2011087936 A2 | 7/2011 |

OTHER PUBLICATIONS

Dango & Dienenthal Plate Filter Brochure, 2011, 6 Pages.
Communication: Extended EP Search Report for EP 14200235, Dated Jan. 3, 2016, 17 Pages.
Communication: Partial EP Search Report for EP 15175703, Dated Jul. 1, 2016, 10 Pages.

* cited by examiner

SCREEN DECANTER FOR REMOVING SOLIDS FROM WASTEWATER

RELATIONSHIP TO OTHER APPLICATIONS AND PATENTS

The present application is a Continuation-In-Part of a pending U.S. patent application Ser. No. 14/984,206 (the '206 application), filed Dec. 30, 2015; which is a Continuation-In-Part of a pending U.S. patent application Ser. No. 14/471,247 (the '247 application), filed Aug. 28, 2014; which is a Continuation-In-Part of a pending U.S. patent application Ser. No. 14/142,197, filed Dec. 27, 2013 (the '197 application). All of the foregoing applications are hereby incorporated herein by reference in their entirety for all purposes.

TECHNICAL FIELD

The present invention relates to the field of waste water treatment; more particularly, to apparatus and method for creating uniform effluent flows through micro-screens to maximize flow volumes and minimize downtime; and most particularly to a screen box (SBX) assembly, also referred to herein and interchangeably as a "screen decanter", comprising a screen, or a plurality of screens operating in parallel for separating liquids from solids.

BACKGROUND OF THE INVENTION

In developed and developing countries, primary treatment and disinfection of waste water discharges from collection systems and waste water treatment facilities is the first step to improving water quality. Typically, secondary and tertiary waste water treatment processes are added to provide additional treatment of the primary effluent.

Primary treatment removes large and dense solids via screening and gravitational settling, allowing neutrally-buoyant matter to pass into the secondary treatment process or receiving body of water. Primary treatment utilizing gravitational settling or clarification is recognized as removing 20-33% of the organic load as measured in Biochemical Oxygen Demand (BOD). Secondary treatment removes another 50+% of the organic load by converting the BOD to biomass, in the form of bacteria, and $CO_2$.

Secondary treatment provides an environment of adequate temperature, volume, mixing, and oxygen, or the absence of oxygen in anaerobic processes, to sustain the bacterial population necessary to consume the BOD and nutrients remaining in the waste water after primary treatment. New organic matter enters the treatment facility continuously so a portion of the existing bacterial population is removed from the process to promote the growth of new bacteria. The effectiveness of primary treatment directly affects secondary process or the receiving body of water if discharged from the collection system.

Primary clarifiers or settling basins are recognized as being the most economical means to reduce BOD in waste water as there is little energy required and no biomass to maintain. Primary treatment creates no biomass and therefore requires no aeration energy; no process controls to monitor the biomass to determine the health of the biomass; no separation or removal of bacteria by moving to a side-stream digester; no aeration of the digester; and no dewatering and disposal of surplus bacteria, also called secondary sludge. The lack of complexity of primary treatment makes it well suited for developing nations to promote recovery of surface waters and aquifers, resulting in a reduction in health issues.

Known primary clarifiers comprise circular or rectangular tanks and are volumetrically and geometrically sized to provide a horizontal fluid velocity lower than the solids settling velocity. The horizontal travel time and distance of the liquid from the inlet to the effluent weir or decanter must be greater than the settling time and distance of the suspended solids so that solids settle out prior to reaching the effluent weir or decanter. These settled solids contain a majority of the BOD in raw sewage. The effectivenss of this first stage is important because the more solids that exit the primary clarifier, the lower the BOD entering the secondary treatment process or the effluent-receiving body of water.

The '197 application discloses an improved screen decanter with an ultrafine screen (also referred to herein as a screen box or "SBX") in the form of a box, oval, or cylinder that is controllably driven in the vertical direction to optimize the exposure of the screen to varying wastewater levels and that can be lifted from the wastewater for backflushing and sterilization in a dedicated overhead apparatus. Because the motion of the screen assembly is only vertical, the required footprint in the tank can be relatively small. An air scour header provides air bubbles to air scour the screen surface. The application further discloses a low profile screen box useful for wastewater systems having high flows, limited surface area to place a screen box, and/or shallow active tank volumes of existing primary clarifiers, where multiple screen boxes or racks may be ganged in parallel to provide the necessary screen surface area at a controlled screen loading rate.

The '197 application further discloses a deflector plate that increases the horizontal travel distance to the screen surface for solids that may be disturbed and start to move towards the screen.

A baffled lifting column and combined stub effluent drain pipe for an SBX are also disclosed in the '197 application. The baffled lifting column is a slotted or perforated circular pipe that is connected to an effluent pipe or hose below the weir or decanter. The lifting columns are centered in the SBX with openings to encourage flow distribution through the screen. A long rectangular screen rack has 3 lifting columns centered and equally spaced in the screen racks. Preferably, the open area of the baffled lifting column is lowest at the bottom and increases with elevation, creating head loss at the lower portion of the lifting column to equalize travel distance and pressure, and thus to equalize flow through the screen from the lowest point to the highest point of liquid contact.

An apparatus and method for simply and automatically preventing fouling of the upstream surface of any screen assembly is disclosed by the '247 application.

The '206 application discloses a screen decanter comprising a rack including a frame; a plurality of screens attached to the frame and positioned to define opposite sides of a longitudinal cavity; baffles attached to the frame and positioned to define two additional opposite sides of the cavity; and at least one perforated drain standpipe disposed within the cavity. Preferably, the screens have a porosity between 25 micrometers and 75 micrometers, most preferably about 50 micrometers. The screen decanter provides a barrier to solids larger than the employed porosity so that liquid passes from the settling tank into the cavity exclusively through the screens. Filtered liquid is drained from the cavity through a pattern of openings along the length of the drain standpipe. The pattern is configured to counteract the range of hydraulic head within the cavity to provide essentially equal flow through the screen and drain standpipes at all depths of immersion. End baffles, pipe positions, and angles that the pipe perforations face, work together to further even out horizontal flow patterns that complement the aforementioned uniform flow at various depths within the cavity.

In using fine-screen apparatus in waste water treatment, both sanitary waste water and food and beverage processing waste water, it is important to address potential fouling and blockage of the screening as a potential operational problem that can lead to inefficiency because of time lost to clean and/or replace clogged screens. Additional maintenance issues are typical in prior art operations, especially in high flow-volume situations such as municipal waste water treatment plants.

What is needed in the art is an improved screen decanter arrangement that increases decanter throughput volume by increasing flow uniformity and hence total flow through the screen element and that increases operational efficiency by increasing the time interval between required screen cleanings and/or screen replacements.

It is a principal object of the invention to increase both the flow rate and the total volume of waste water effluent through a wastewater treatment system, in comparison with known arrangements, without fouling decanter screens prematurely or increasing the overall footprint of a screen box assembly, and thus without increasing the overall footprint of the primary treatment facility.

To enable this principle, it is a further object of the invention to control the waste water flow through a screen decanter so that all portions of all screens experience approximately the same flow rate, thus minimizing localized, high-peak flow regions that can clog portions of fine screens, and maximizing decanter throughput.

SUMMARY OF THE INVENTION

The present invention is directed to apparatus and method wherein an improved screen decanter in a waste water treatment system is provided with a plurality of cylindrical outer screens and drain standpipes configured to increase total flow rate through the screens by equalizing flow rates through all unit areas of the screens at all immersed levels.

In accordance with a currently preferred embodiment of the present invention, a screen decanter for screening solids from waste water in a waste water treatment system comprises a drain manifold and a plurality of cylindrical cartridges mounted to the drain manifold, each of the cylindrical cartridges having an outer screen defining a cavity therewithin. Each of the cartridges includes a drain standpipe disposed within the cavity in communication with the drain manifold. Each drain standpipe includes a plurality of patterned openings arranged in at least one row along the length and partial circumference thereof. Preferably, each drain standpipe comprises three rows of patterned openings, each row being disposed at a 120° rotational angle from the adjacent row of patterned openings. Preferably, each drain standpipe is disposed at a 30° rotational angle from its immediate neighbor drain standpipe, in both the same row and the adjacent row of cartridges, such that no row of patterned openings in any of said drain standpipes faces directly at any other row of patterned openings in any other drain standpipe.

BRIEF DESCRIPTION OF THE DRAWINGS

The present invention will now be described, by way of example, with reference to the accompanying drawings, in which.

DETAILED DESCRIPTION OF THE INVENTION

Figure 1:
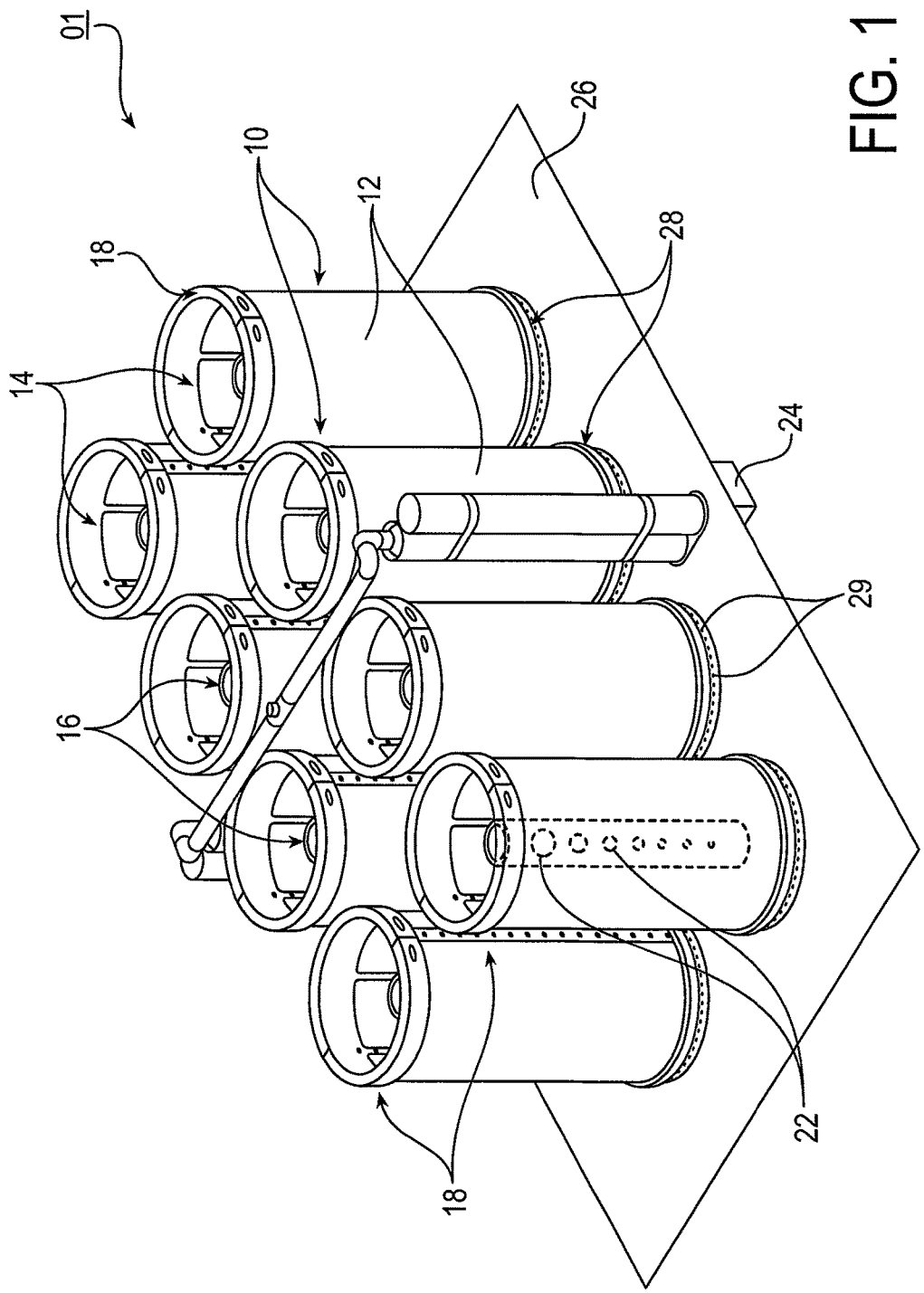
FIG. 1 is a first isometric view from above of an embodiment of a screen decanter (SBX) in accordance with the present application.
Figure 2:
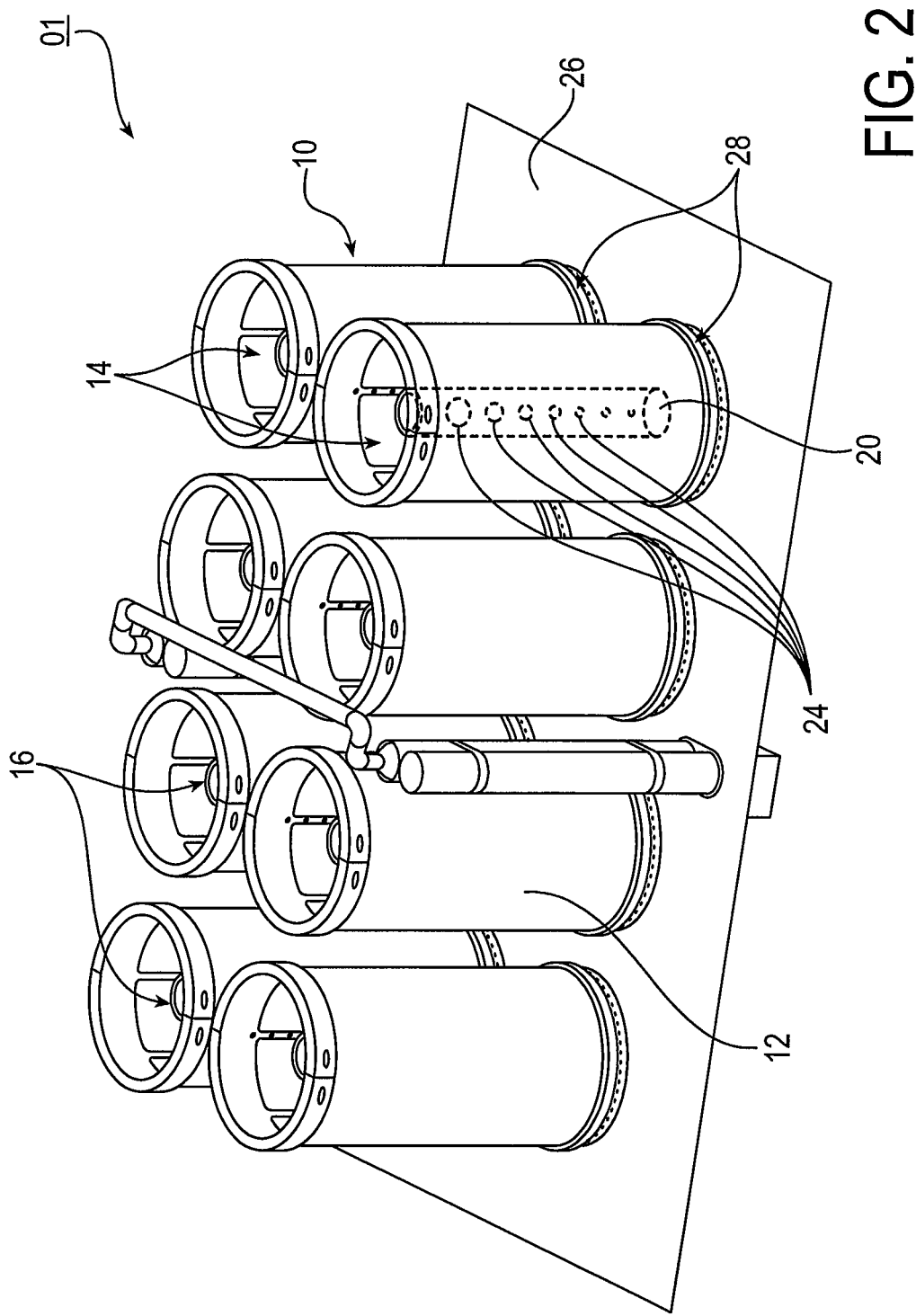
FIG. 2 is a second isometric view of the screen decanter shown in FIG. 1.

Throughout the following description, specific elements are set forth in order to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale.

Referring to FIGS. 1-6, a preferred embodiment of a screen box (SBX) assembly 01 in accordance with the present invention comprises at least one cartridge 10 and, in a currently preferred embodiment, eight cartridges disposed in two rows of four cartridges each. Each cartridge 10 comprises a screen 12 forming a cavity 14 within which one or more drain standpipes 16 are located to draw waste water through the screen. Screens 12 are preferably shaped in the form of a cylinder with a circular base, although other configurations are possible. In a preferred embodiment, screens 12 are ultrafine screens having pores that are approximately fifty micrometers in diameter. A frame 18 removably attached to and supporting screens 12 serves to further define cavity 14 and forms the bottom of each cartridge 10, providing a barrier so that liquid may pass from outside of cartridge 10 into cavity 14 exclusively through screens 12 as the SBX assembly 01 operates during decanting.

The vertical placement of SBX assembly 01 relative to the surface of liquid in a tank in a wastewater treatment system is such that the SBX assembly is submerged only to the depth necessary to bring liquid approximately to the tops of screens 12 but no further to prevent fluid from spilling over the top of frame 18.

At least one opening 20 is located at the bottom and inside of cartridge 10, through which liquids may flow from cavity 14 inside the cartridge to outside the cartridge. At least one drain standpipe 16 is located inside the cavity 14 at opening 20 forming a channel for the flow of liquid from inside cavity 14 to opening 20.

In a currently preferred embodiment, at least one row of patterned perforations 24, and preferably three longitudinal arrays of such patterned perforations as are described below, is formed in each drain standpipe 16. (For convenience, the terms "perforations", "holes", and "openings" are used interchangeably herein.) The cross-sectional areas of perforations 24 increase with increasing height along the length of each drain pipe 16. Perforations 24 receive decanted fluid from each cavity 14 and are distributed along drain standpipes 16 to promote uniform flow by counteracting the gravitational head of filtered effluent within each screen 12.

Referring to FIGS. 3A-3G, in exemplary drain standpipes 16 various configurations of suitable perforations 24 (holes 24a, vertical slots 24b tapering or of variable length, horizontal slots 24c, and screening 24d) are shown.

Figure 3A:
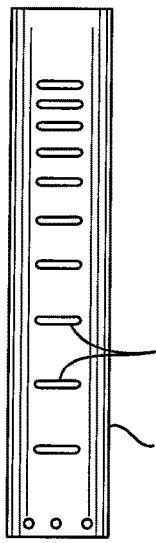
FIGS. 3A-3G are elevational views of alternate configurations of patterned openings in a drain standpipe.
Figure 3B:
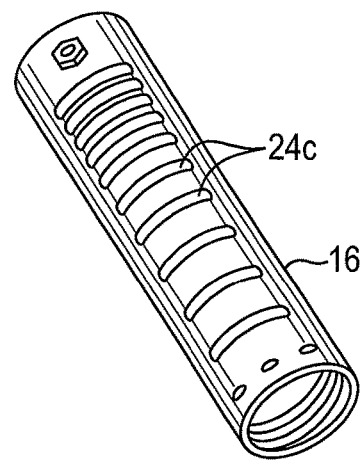
Figure 3C:
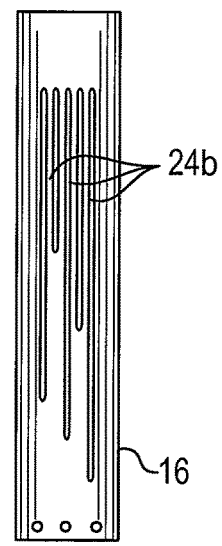
Figure 3D:
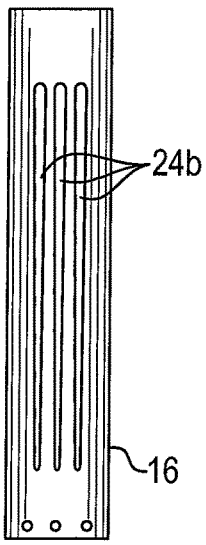
Figure 3E:
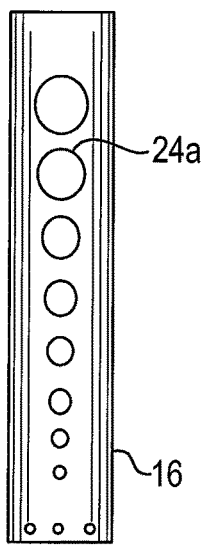
Figure 3F:
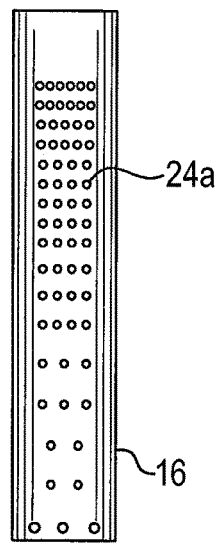
Figure 3G:
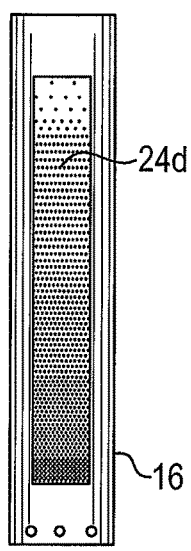

Referring to FIG. 3E, in a currently preferred embodiment, a drain standpipe 16 is of constant diameter along its length. A plurality of holes 24a perforate the drain standpipe 16, and are vertically spaced along the length of the drain standpipe with at least two of the holes 24a having different diameters.

Figure 4:
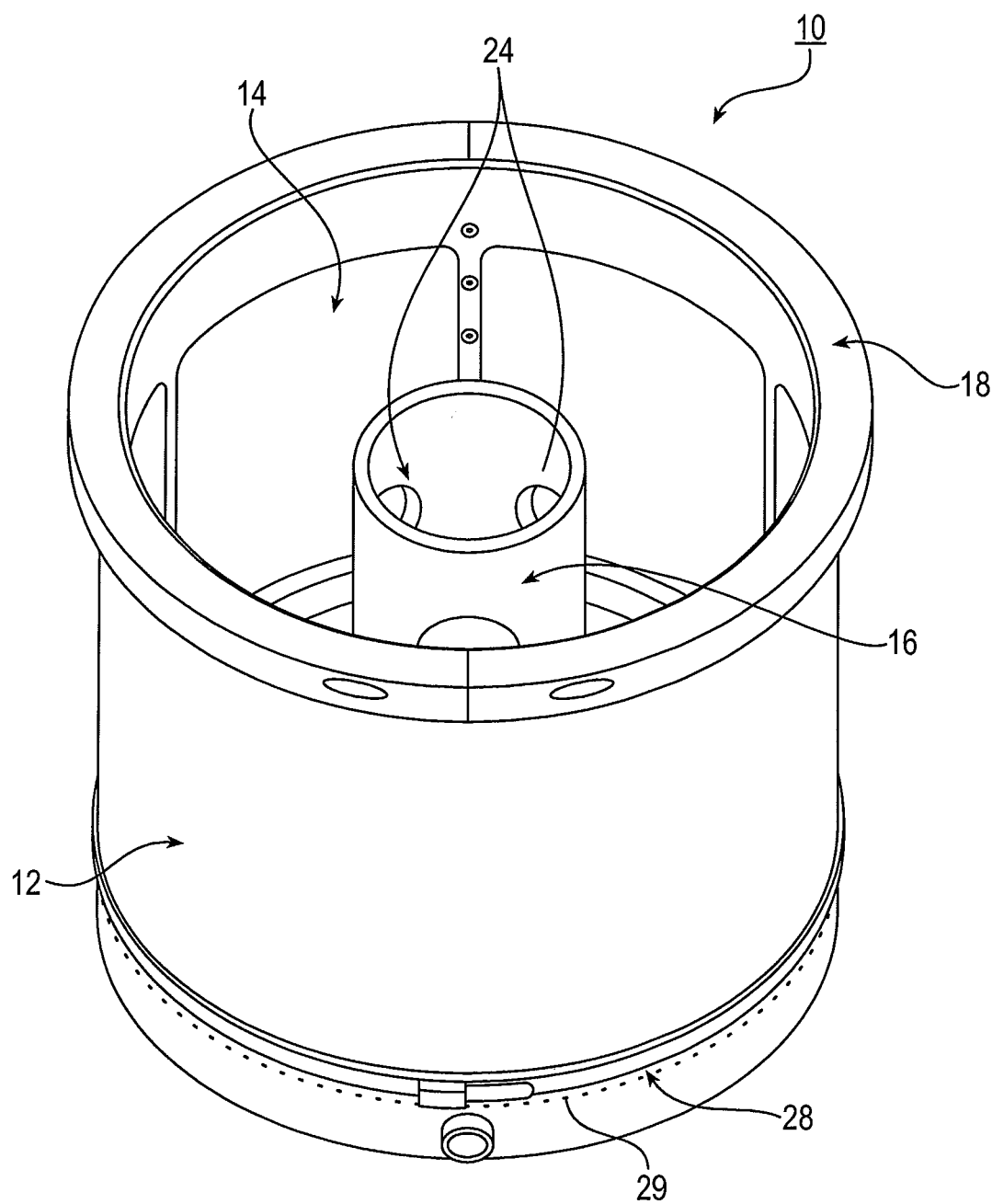
FIG. 4 is an isometric view from above of an individual screen cartridge of the screen decanter shown in FIGS. 1 and 2.
Figure 6:
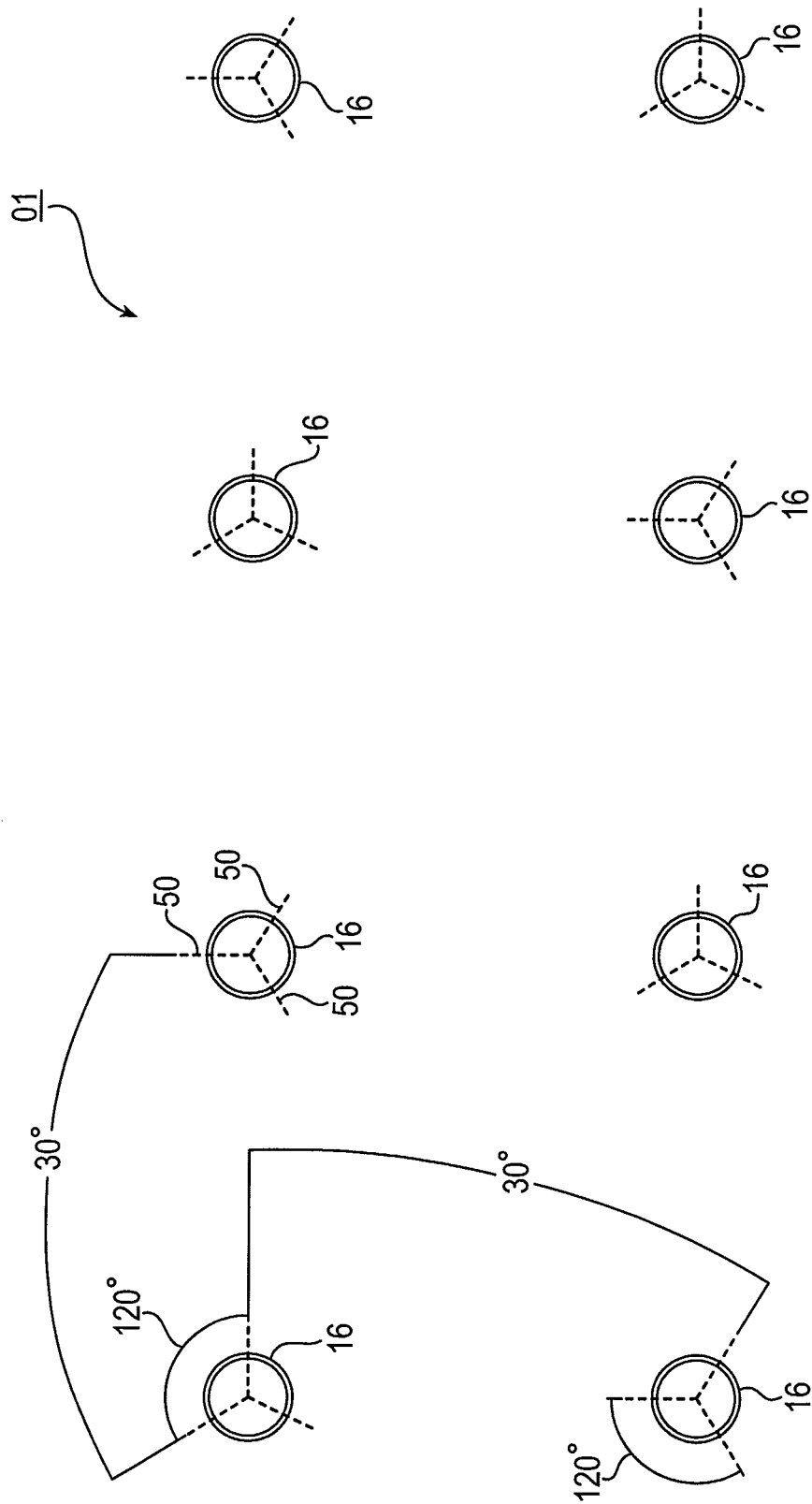
FIG. 6 is a schematic horizontal cross-sectional view of a portion of a the screen decanter shown in FIG. 1, showing a currently preferred orientation of each of the drain standpipes with respect to adjacent drain standpipes.

In a currently preferred embodiment, as shown in FIGS. 4 and 6, holes 24a are arrayed in three vertical rows of holes with each row evenly spaced about the circumference of said drain standpipe 16, i.e., so that each row of holes is disposed at about ⅓ of the way around the circumference of the drain standpipe, that is, 120°, from the next row of holes. The holes 22a promote uniform flow at all depths of immersion across each screen 12. The same arrangement of holes applies to the other types of holes shown in FIG. 3.

Referring now to FIG. 6, drain stand pipes 16 are disposed in a currently preferred arrangement in SBX embodiment 01. In plan view, each drain standpipe 16 having three rows of holes at 120° from its adjacent row of holes is mounted at a 30° rotation from its immediate neighbor drain standpipe, in both the same row and the adjacent row. (The centerlines 50 of each row of openings 24 is shown for each drain standpipe 16.) Thus no row of openings in any drain standpipe 16 faces any other row of openings in any other drain standpipe. Various combinations of drain standpipe orientations can be shown to meet these criteria and all such combinations are fully comprehended by the present invention.

Referring again to FIGS. 1, 2, and 5, a manifold 24 collects liquids from each drain stand pipe 16 via opening 20 in the bottom of each cartridge 10. Further, in a currently preferred embodiment, a deflector plate 26 is disposed between cartridges 10 and manifold 24 in screen box assembly 01 to suppress vertical motion of liquid in a tank below the screen box assembly, in effect preventing larger settled BOD particles below the SBX from moving up in the tank and fouling the screens 12 of the screen box assembly.

In a currently preferred embodiment, an air plenum 28 is attached to a lower region of each frame 20 in screen box assembly 01, each air plenum being supplied from a source of compressed gas and being provided with exit openings such as slots or holes 29 so that air bubbles exiting the air plenum 28 through the exit openings 29 flow upward along, near, and through the surfaces of screens 12 of the screen box assembly to scour and clean the screens.

Figure 5:
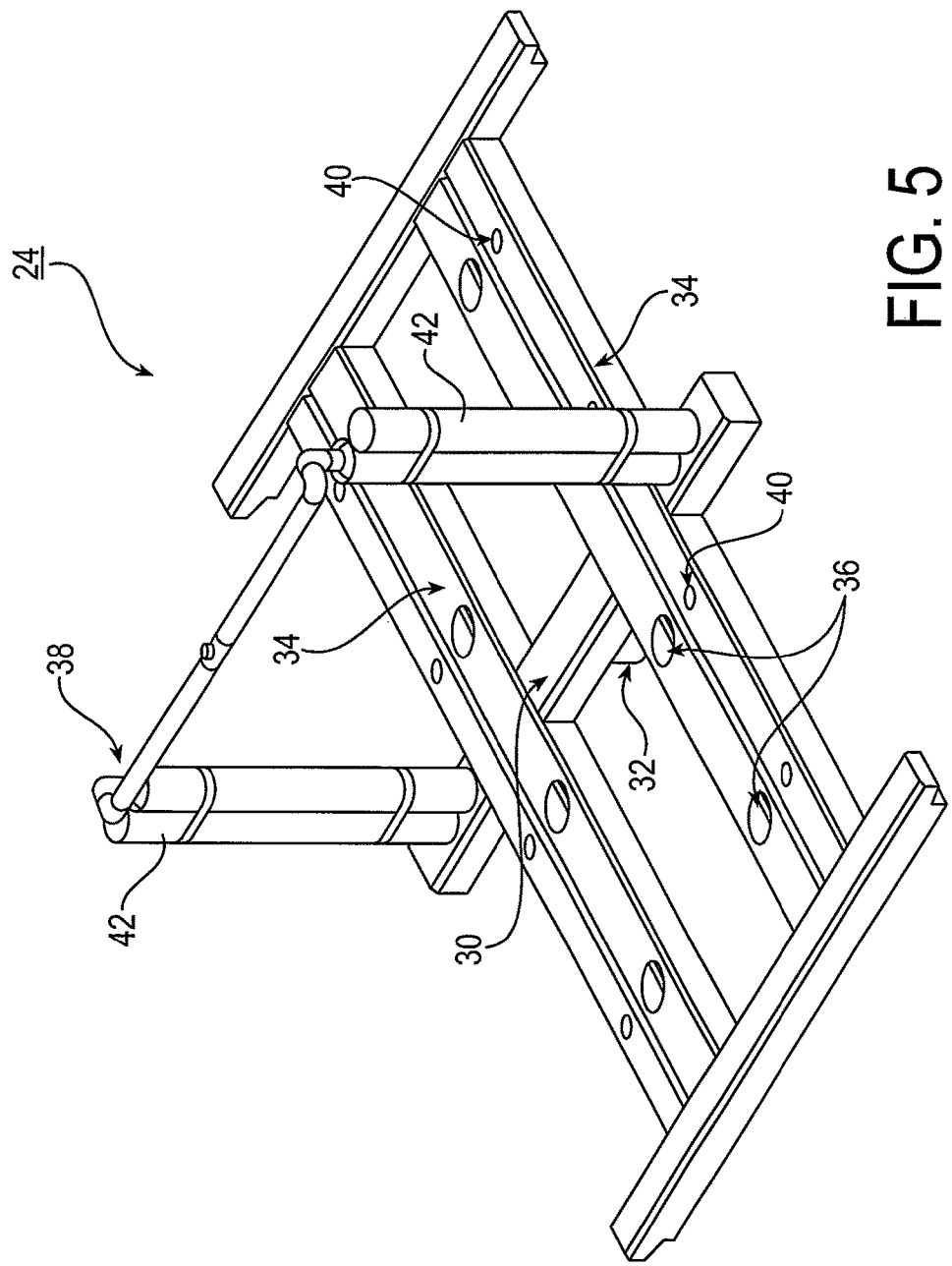
FIG. 5 is an isometric view from above of a manifold of the screen decanter shown in FIG. 1.

Referring now to FIG. 5, manifold 24 comprises a central drain channel 30 terminating in a drain outlet 32. Central drain channel 30 is transected by a plurality of feeder channels 34 that drain into the central drain channel 30. In turn, cartridges 10 (not shown here) transect and drain into feeder channels 34 via mating ports 36 that are sealed between the cartridges and feeder channels. Compressed gas from a source, not shown, enters manifold 24 via gas intake port 38 and exits the manifold via air exit ports 40 that are sealed between the cartridges and feeder channels. Lifting columns 42 are provided for railing and lowering decanter 01.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A screen decanter for screening solids from waste water in a waste water treatment system comprising:
    a) a drain manifold; and
    b) a plurality of cylindrical cartridges mounted to said drain manifold, each of said cylindrical cartridges having an outer screen defining a cavity therewithin,
    wherein at least one of said cartridges includes at least one drain standpipe disposed within said cavity and in communication with said drain manifold, and
    wherein said at least one drain standpipe includes a plurality of patterned openings arranged in at least one row along the length and partial circumference thereof.

2. A screen decanter in accordance with claim 1 wherein said plurality of cylindrical cartridges are arranged on said manifold structure in parallel rows and wherein each of said cartridges includes a drain standpipe as claimed in claim 1.

3. A screen decanter in accordance with claim 2 wherein each of said drain standpipes comprises a plurality of rows of patterned openings.

4. A screen decanter in accordance with claim 3 comprising three rows of patterned openings, each row being disposed at a first rotational angle from its adjacent row of patterned openings.

5. A screen decanter in accordance with claim 4 wherein said first rotational angle is 120°.

6. A screen decanter in accordance with claim 4 wherein each of said drain standpipes is oriented at a second rotational angle from its immediate neighbor drain standpipe in both the same row and the adjacent row.

7. A screen decanter in accordance with claim 6 wherein said second rotational angle is 30°.

8. A screen decanter in accordance with claim 3 wherein no row of patterned openings in any of said drain standpipes faces any other row of patterned openings in any other drain standpipe.

9. A screen decanter in accordance with claim 3 wherein the shape of said patterned openings is selected from the group consisting of horizontal slots, vertical slots, circular, screening, and combinations thereof.

10. A screen decanter in accordance with claim 1 further comprising a deflector plate disposed between said plurality of cartridges and said drain manifold.

11. A screen decanter in accordance with claim 1 wherein said outer screens have pores that are between about 25 micrometers and about 75 micrometers in diameter.

12. A screen decanter in accordance with claim 1 further comprising a perforated air plenum disposed adjacent each of said outer screens.

13. A screen decanter for screening solids from waste water in a waste water treatment system comprising:
    a) a drain manifold;
    b) a plurality of cylindrical cartridges mounted to said drain manifold in a plurality of rows, each of said cylindrical cartridges having an outer screen defining a cavity therewithin,
    wherein each of said outer screens has pores that are between 25 and 75 micrometers in diameter,
    wherein each of said cartridges includes a drain standpipe disposed within said cavity and in communication with said drain manifold, wherein each of said drain standpipes includes a plurality of patterned openings arrayed in at least one row along the length and partial circumference thereof, and wherein no row of patterned openings in any of said drain standpipes faces any other row of patterned openings in any other drain standpipe; and c) a deflector plate disposed between said plurality of cartridges and said drain manifold.

* * * * *